US012297700B2

(12) United States Patent
Juarez et al.

(10) Patent No.: US 12,297,700 B2
(45) Date of Patent: *May 13, 2025

(54) CURVILINEAR SEALING SYSTEM

(71) Applicant: HYDRIL COMPANY, Houston, TX (US)

(72) Inventors: Alejandro Juarez, Cypress, TX (US); Nishikant V. Raje, Houston, TX (US)

(73) Assignee: HYDRIL COMPANY, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/446,934

(22) Filed: Aug. 9, 2023

(65) Prior Publication Data
US 2023/0383609 A1 Nov. 30, 2023

Related U.S. Application Data

(63) Continuation of application No. 16/883,134, filed on May 26, 2020, now Pat. No. 11,753,876, which is a continuation of application No. 15/962,043, filed on Apr. 25, 2018, now Pat. No. 10,697,251.

(60) Provisional application No. 62/505,262, filed on May 12, 2017.

(51) Int. Cl.
*E21B 17/042* (2006.01)
*E21B 17/08* (2006.01)
*F16L 15/00* (2006.01)
*F16L 15/06* (2006.01)

(52) U.S. Cl.
CPC .......... *E21B 17/0423* (2013.01); *E21B 17/08* (2013.01); *F16L 15/002* (2013.01); *F16L 15/06* (2013.01); *Y10T 29/49881* (2015.01)

(58) Field of Classification Search
CPC ..... F16L 15/002; F16L 15/06; E21B 17/0423; E21B 17/08
USPC .................................................. 285/333, 334
See application file for complete search history.

(56) References Cited

U.S. PATENT DOCUMENTS

| | | | |
|---|---|---|---|
| 7,997,627 B2 | 8/2011 | Sugino et al. | |
| 9,388,925 B2 | 7/2016 | Juarez | |
| 9,816,646 B2 | 11/2017 | Carrois et al. | |
| 2018/0283109 A1* | 10/2018 | Martin | E21B 17/0423 |

* cited by examiner

*Primary Examiner* — Zachary T Dragicevich
(74) *Attorney, Agent, or Firm* — Morgan, Lewis & Bockius LLP

(57) ABSTRACT

A sealing system connecting first and second tubular members includes a first curvilinear sealing surface on the first tubular member and a second curvilinear sealing surface on the second tubular member. Both the first and second curvilinear sealing surfaces are disposed between two sets of threading on the respective first and second tubular members. When the first and second tubular members are in a connected configuration, the first and second curvilinear sealing surfaces contact and interfere to form an annular curvilinear center seal. A relief pocket may be disposed adjacent to the first and/or second curvilinear sealing surfaces to contain excess lubricant between the first and second tubular members.

13 Claims, 8 Drawing Sheets

CURVILINEAR SEALING SYSTEM

TECHNICAL FIELD

The present application relates to tubular connections, and more particularly, to a tubular connection seal configuration having contacting curvilinear surfaces.

BACKGROUND

This section is intended to introduce various aspects of art that may be related to various aspects of the present techniques, which are described and/or claimed below. This discussion is believed to be helpful in providing background information to facilitate a better understanding of the various aspects of the present disclosure. Accordingly, it should be understood that these statements are to be read in this light, and not as admissions of prior art. The following descriptions and examples are not admitted to be prior art by virtue of their inclusion in this section.

The oil and gas industry is drilling upstream production wells of increasing depth and complexity to find and produce raw hydrocarbons. The industry routinely uses steel pipe, considered an Oil Country Tubular Good (OCTG) to protect the borehole (i.e., casing) and to control the fluids produced within the pipe (i.e., tubing). Such pipe, including casing and tubing, are made and transported in relatively short segments and installed in the borehole one segment at a time, with each segment being connected to the next. As the search for oil and gas has driven companies to drill deeper wells, pipes may be subject to increased complexity and magnitude of forces throughout their lifespans downhole. Industry demands have grown for casing, tubing, and connectors having increased tensile and pressure strengths. Furthermore, the developing area of deviated and horizontal wells have exacerbated this trend, further adding increased torsional loads as another requirement for casing and tubing connectors.

Connectors have been designed with varying thread, shoulder, and seal configurations. For example, two general connector thread configurations include a threaded and coupled connector and an integral connector. A thread and coupled connector includes a pin (i.e., a male threaded end) machined on relatively long joints of pipe and joined by the box (i.e., a female threaded end) machined on a relatively short coupling. An integral connector includes a pin threaded on a full-length pipe connected to a box threaded to another full-length pipe, and pin and box ends may be threaded onto opposite sides of each full-length pipe segment so that each segment may be connected for a length of a borehole. One type of shoulder and seal combination includes a center shoulder seal, which includes a sealing section in a connection disposed between at least two threaded portions. The sealing section of a pin or box may have direct contact with the sealing section of another pin or box and may function to prevent the passage of liquid or gas across the threads of the assembled connection. As industry demands connectors with increasingly high tensile strength, pressure strength, and torque, etc., the general features of connectors may be further designed and engineered to meet downhole performance criteria.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a sealing system includes a first tubular member and a second tubular member. The first tubular member includes a first thread set and a second thread set and a first curvilinear sealing surface disposed axially between the first and second thread sets. The second tubular member includes a third thread set and a fourth thread set and a second curvilinear sealing surface disposed axially between the third and fourth thread sets. The first tubular member and the second tubular member are configured to connect when the first thread set engages with the third thread set and the second thread set engages with the fourth thread set. The first and second curvilinear sealing surfaces are configured to interfere at an interference region when the first and second tubular members connect.

Some embodiments include one or both of a first relief recess disposed on the first tubular member, between the first thread set and the first curvilinear sealing surface and a second relief recess disposed on the second tubular member, between the fourth thread set and the second curvilinear sealing surface. In some embodiments, the first, second, third, and fourth thread sets comprise square threads, wedge threads, variable pitch threads, or combinations of different thread geometries. In different embodiments, the first and second curvilinear sealing surfaces may have an elliptical curve, a circular curve, a toroidal curve, a varying-radius curve, or curve combinations of these curves. The first and second curvilinear surfaces may have identical curves or different curve geometries. Moreover, in different embodiments, the first and second curvilinear surfaces may be symmetrical or asymmetrical when the first and second tubular members connect. The interference region may be approximately centered between the first and second thread sets, or may be at any axial point between the first and second thread sets. In some embodiments, the sealing system is configured such that an axis of the annular seal may change without forming discontinuities in the annular seal.

In another embodiment, a method includes moving a first tubular member relative to a second tubular member, such that a pin end of the first tubular member enters and axially overlaps with a box end of the second tubular member. The method further includes rotating the first tubular member relative to the second tubular member, such that a first threading and a second threading on the first tubular member engages with a third threading and a fourth threading on the second tubular member, respectively. The method then involves connecting the first tubular member to the second tubular member, such that a first curvilinear surface on the first tubular member between the first and second threading contacts a second curvilinear surface on the second tubular member between the third and fourth threading. A contact force between the first and second curvilinear surfaces form an annular seal between the first and second tubular members.

In some embodiments, the contact force comprises a compressional force between the first and second curvilinear surfaces. Furthermore, in some embodiments, the contact force comprises a radial force extending along an annular dimension between the first and second tubular members to form the annular seal.

In some embodiments, rotating the first tubular member relative to the second tubular member comprises displacing lubricant between the pin end and the box end into at least one of a first recess on the first tubular member between the first thread and the first curvilinear surface and a second recess on the second tubular member between the fourth thread and the second curvilinear surface.

One or more embodiments include a connection having a curvilinear center seal. The connection includes a first tubular member having a first thread set and a second thread set and a first curvilinear surface disposed axially between the first and second thread sets and a second tubular member having a third thread set and a fourth thread set and a second curvilinear surface disposed axially between the third and fourth thread sets. The first tubular member and the second tubular member connect when the first thread set engages with the third thread set and the second thread set engages with the fourth thread set to result in radial force between the first curvilinear surface and the second curvilinear surface.

In some embodiments, the first and third thread sets have wedge thread geometries, the second and fourth thread sets have wedge thread geometries, or the first, second, third, and fourth thread sets have wedge thread geometries.

BRIEF DESCRIPTION OF THE DRAWINGS

Embodiments of the present techniques are described with reference to the following figures. The same numbers are used throughout the figures to reference like features and components. Various embodiments may utilize elements and/or components other than those illustrated in the drawings, and some elements and/or components may not be present in various embodiments. Elements and/or components in the figures are not necessarily drawn to scale.

DETAILED DESCRIPTION

Figure 1:
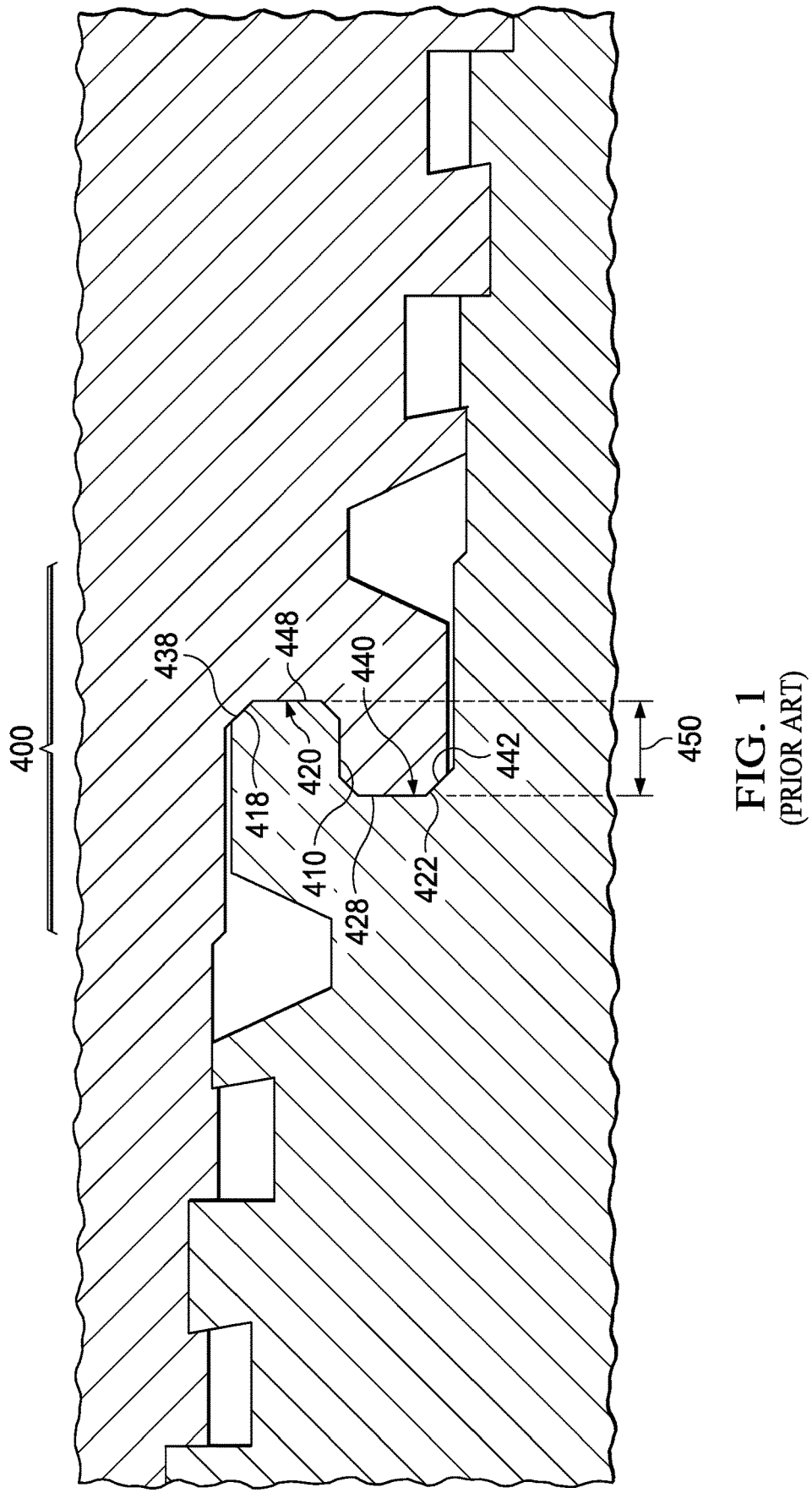
FIG. 1 is a partial cross-section of a center shoulder seal arrangement.

FIG. 1 is a center shoulder seal connection having five metal-to-metal seals: two metal-to-metal seals at the exterior beveled edges of the locked double shoulder seal 400 where sealing surfaces 418 and 438 are in contact and where sealing surfaces 422 and 442 are in contact; and, three zero clearance surfaces at the interior of the locked double shoulder seal 400, one 410 at the wall surface where sealing cylindrical surfaces contact, another zero clearance surface where the annular face surface of the pin shoulder 420 contacts the box undercut surface 448, and another zero clearance surface where the face surface of box shoulder 440 contacts pin undercut surface 428. Thus, center-shoulder seal 400 forms a very close fitting metal-to-metal seal having mating metal-to-metal sealing surfaces which allow a build-up of stored energy within the seal upon power tightening of the assembled connection, such that upon the application of various loads on the pipe and also the connection, the seal will continue to perform and maintain sealing engagement. Notably, all of the metal-to-metal seals are formed within the axial space 450 between the sets of contacting annular faces of the center shoulder, and the metal-to-metal seals at the exterior beveled edges of shoulder seal 400, each of which exhibits radial forces, are each located immediately adjacent a respective one of the sets of contacting annular faces.

Figure 2:
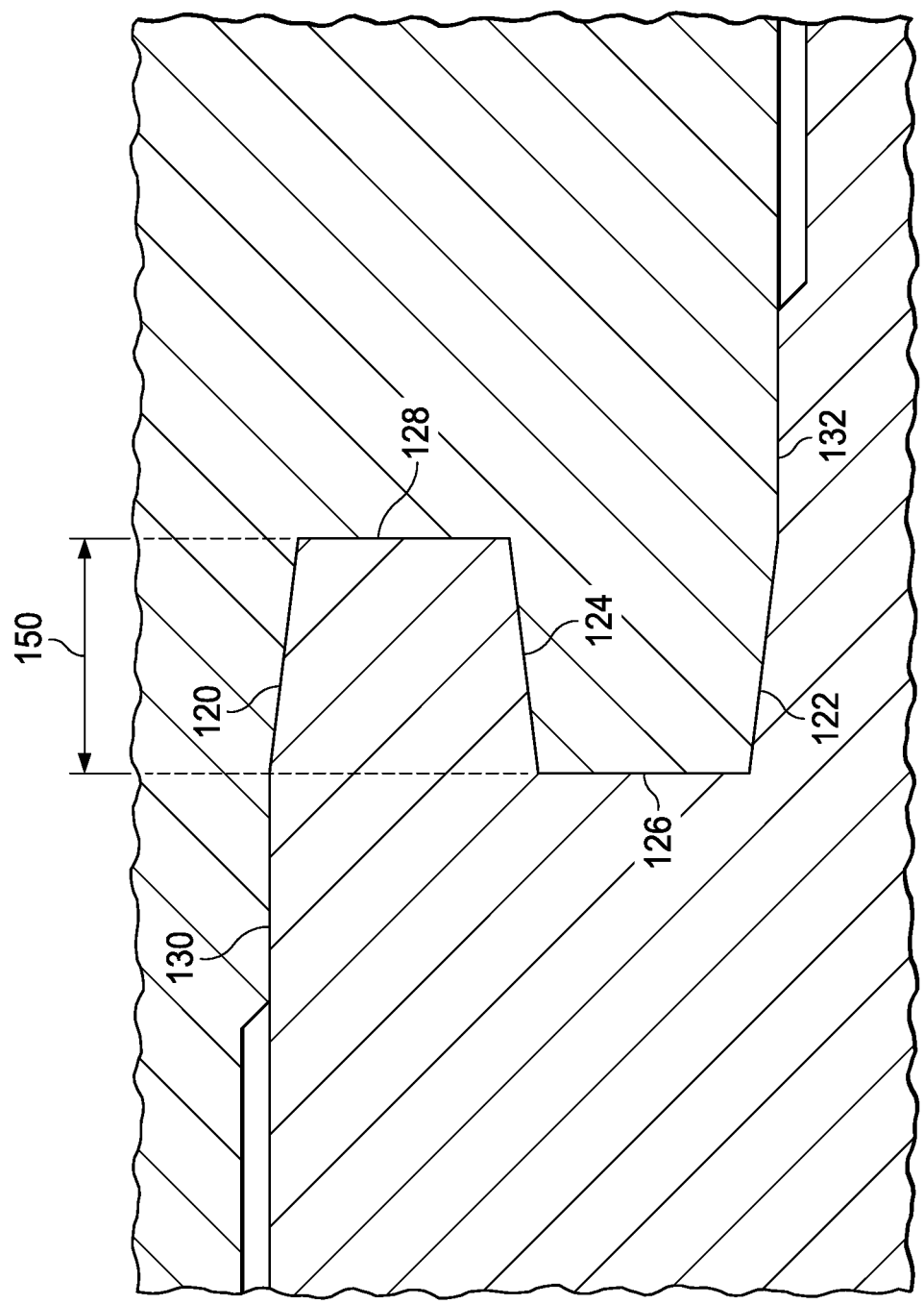
FIG. 2 is a partial cross-section of another center shoulder seal arrangement.

FIG. 2 is a center shoulder seal connection having at least two and up to seven metal-to-metal seals are established between the pin and box members. Three of the seven seals are frustum seals. A first outer frustum seal 120 is formed by the engagement of pin and box frustoconical surfaces at the radially outer side of the center shoulder and a second inner frustum seal 122 is formed between pin and box frustoconical surfaces at the radially inner side of the center shoulder. The third frustum seal is a center frustum seal 124 formed between intermediated pin and box center frustoconical surfaces. Two annular shoulder seals are formed. A first inner annular shoulder seal 126 a second outer annular shoulder seal 128, each by engaged annular surfaces of the pin and box members. Two cylindrical seals are also formed. A first outer cylindrical seal 130 is formed by the engagement of pin and box outer seal cylindrical surfaces at the radially outer side and a second inner cylindrical seal 132 is formed by the engagement of pin and box seal cylindrical surfaces at the radially inner side. Notably, this arrangement also places each of the metal-to-metal seals that are exposed to significant radial and hoop forces (i.e., contacting seals 122 and 120) immediately adjacent a respective one of the sets of contacting annular faces (i.e., at annular contacting seals 126 and 128) and likewise within the axial space 150 between the two annular shoulder seals.

Figure 3:
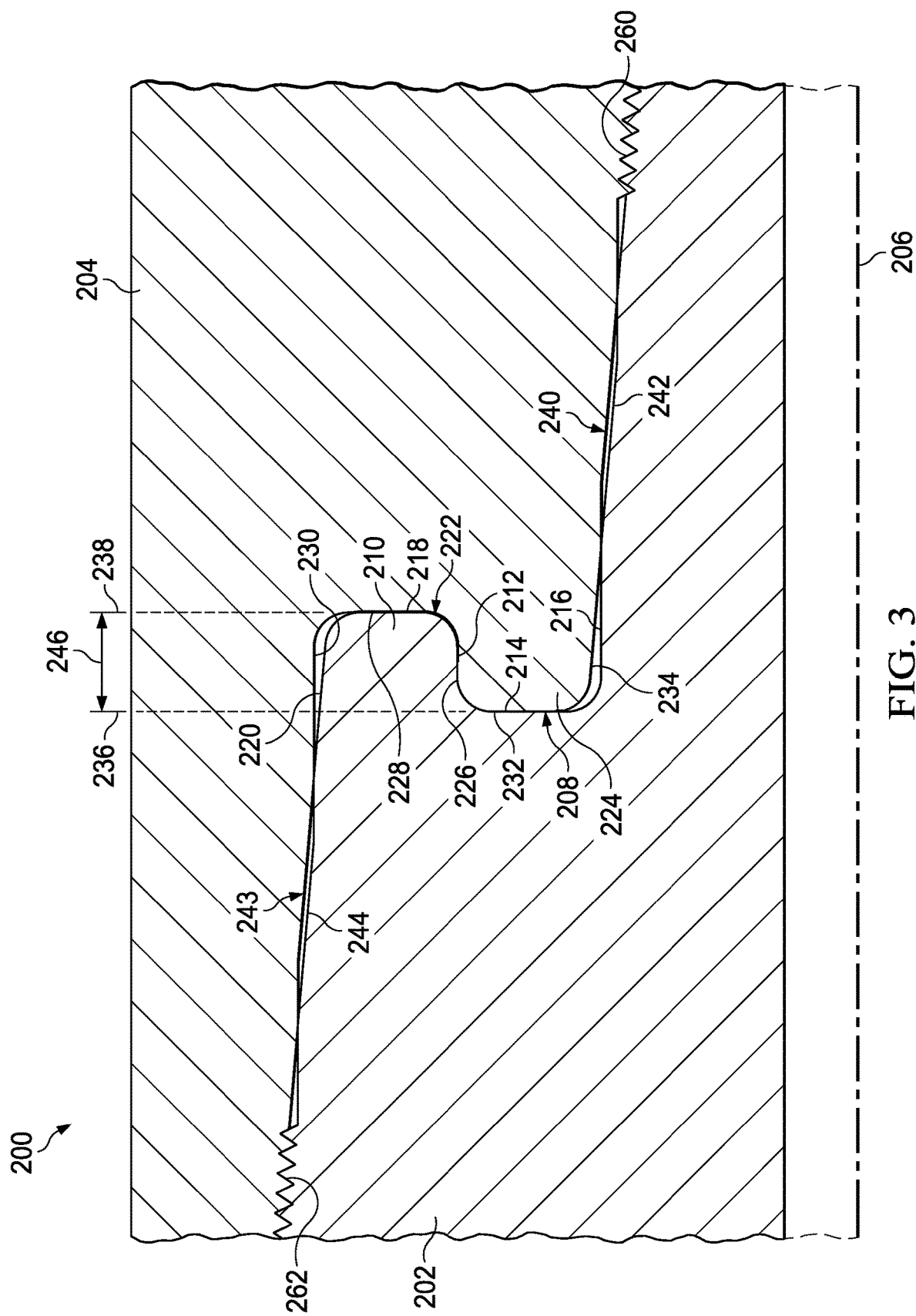
FIG. 3 is a partial cross-section of one embodiment of a center shoulder seal.

Referring to FIG. 3, a partial cross-section of a center shoulder connection 200 between two tubular members 202 and 204 is shown. Tubular member 202 forms the pin portion of the connection and tubular member 204 forms the box end of the connection. An axial centerline of the connection is shown at 206, and it is recognized that a full cross-section of the center shoulder connection would include a mirror image of the components on the opposite side of the axial centerline (i.e., below the centerline 206 in FIG. 3).

A seal configuration on tubular member 202 includes an annular groove 208 and an annular tooth 210. The annular groove 208 is defined by a radially inward facing (i.e., facing toward the centerline 206) undercut surface 212, an adjacent annular shoulder face 214 and an adjacent radially outward facing surface 216. The annular tooth is defined by the radially inward facing undercut surface 212, an annular tooth face 218 and a radially outward facing surface 220. In the illustrated embodiment, the surface 216 includes a corner radius that transitions to the shoulder face 214, and the surface 220 includes a corner radius that transitions to the tooth face 218.

A seal configuration on the tubular member 204 includes an annular groove 222 and an annular tooth 224. The annular groove 222 is defined by a radially outward facing undercut surface 226, an adjacent annular shoulder face 228 and an adjacent radially inward facing surface 230. The annular tooth 224 is defined by the radially outward facing undercut surface 226, an annular tooth face 232 and a radially inward facing surface 234. In the illustrated embodiment, the surface 230 includes a corner radius that transitions to the shoulder face 228, and the surface 234 includes a corner radius that transitions to the tooth face 232.

FIG. 3 shows the connection in made up condition, in which the annular tooth 224 is positioned within the annular groove 208 with the annular tooth face 232 engaging the annular shoulder face 214 to define one shoulder, which is represented by shoulder plane 236. Likewise, the annular tooth 210 is positioned within the annular groove 222 with the annular tooth face 218 engaging the annular shoulder face 228 to define another shoulder, which is represented by shoulder plane 238. In the illustrated embodiment the undercut surfaces 212 and 226 also engage each other, which can act as a further sealing location, as can the engaged shoulders. At opposite axial sides of the connection, engaged threaded sections or the tubular members are also shown schematically at 260 and 262.

As illustrated, clearance may be provided between the radially outward facing surface 216 and the radially inward facing surface 234 in vicinity of the shoulder plane 236. The location of primary sealing contact between the radially outward facing surface 216 and the radially inward facing surface 234, which location is shown in FIG. 3 at 240, is spaced axially away from the shoulder plane 236 to define a metal-to-metal seal contact area 242 (represented by interference of the surfaces shown in cross-hatch) that is axially spaced from the shoulder plane 236. As used herein the terminology "location of primary sealing contact" between two specified surfaces means the location of maximum contact pressure between the two surfaces. Thus, by way of example, in some embodiments surfaces 216 and 234 may make slight contact with each other in the vicinity of the shoulder plane 236 (e.g., within an axial region 246 between the shoulder planes 236 and 238) while, at the same time, the location of primary sealing contact between the surfaces 216 and 234 is spaced further away from the shoulder plane 236. Generally, the location of maximum contact pressure, and thus the location of primary sealing contact, will occur proximate the location of maximum interference between the surfaces.

Clearance may also be provided between the radially inward facing surface 230 and the radially outward facing surface 220 in vicinity of the shoulder plane 238 or, as noted above, only slight contact between the surfaces may occur in the vicinity of the shoulder plane 238. Regardless, the location of primary sealing contact between the radially inward facing surface 230 and the radially outward facing surface 220, which location is shown in FIG. 3 at 243, is spaced axially away from the shoulder plane 238 to define a metal-to-metal seal contact area 244 (represented by interference of the surfaces shown in cross-hatch) that is axially spaced from the shoulder plane 238. Notably, in the case of both primary seal contact areas 242 and 244 of the illustrated embodiment, the location of primary sealing contact is located outside of the axial region 246 of the connection defined between the two shoulders planes 236 and 238.

The exact location of primary sealing contact between the surfaces (e.g., 216 and 234 or 220 and 230) can vary based upon various factors, including the necessary torque limit required in the connection, as well as thickness and diameter of the tubular connection.

By way of example: the location of primary sealing contact 240 may be axially spaced from the shoulder plane 236 by between about 25 thousandths of an inch and about one inch; the location of primary sealing contact 243 may be axially spaced from the shoulder plane 238 by between about 25 thousandths of an inch and about one inch; the axial region 246 may extend from between about 20 thousandths of an inch and about 250 thousandths of an inch; a radial spacing between the radially outward facing surface 216 and the radially outward facing surface 220 in the shoulder plane 236 may be between about 40 thousandths of an inch and about 500 thousandths of an inch; and a radial spacing between the radially inward facing surface 230 and the radially inward facing surface 234 in the shoulder plane 238 may be between about 40 thousandths of an inch and about 500 thousandths of an inch.

In the illustrated embodiment, each of the surfaces 216, 220, 230 and 234 are shown as curvilinear surfaces. Such curvilinear surfaces may, by way of example, when considered in two dimensions along a plane that extends through and runs parallel to the central axis 206 of the connection, include elliptical curves, circular curves, varying radius curves of any suitable type (e.g., curve radius generally between about 0.5 inches and about 15 inches for most effective sealing), or combinations thereof, and the corresponding 3-D surface shapes produced upon rotation of any such curve about the central axis 206 of the connection. However, it is recognized that the surfaces need not be entirely curvilinear or, for that matter, curvilinear at all. For example, in one possible modified version of the embodiment of FIG. 3, surfaces 220 and 234 remain curvilinear, but surfaces 216 and 230 are made frustoconical, such that each location of primary sealing contact 240 and 243 is made with respect to an interference between a curvilinear surface and a frustoconical surface.

Figure 4:
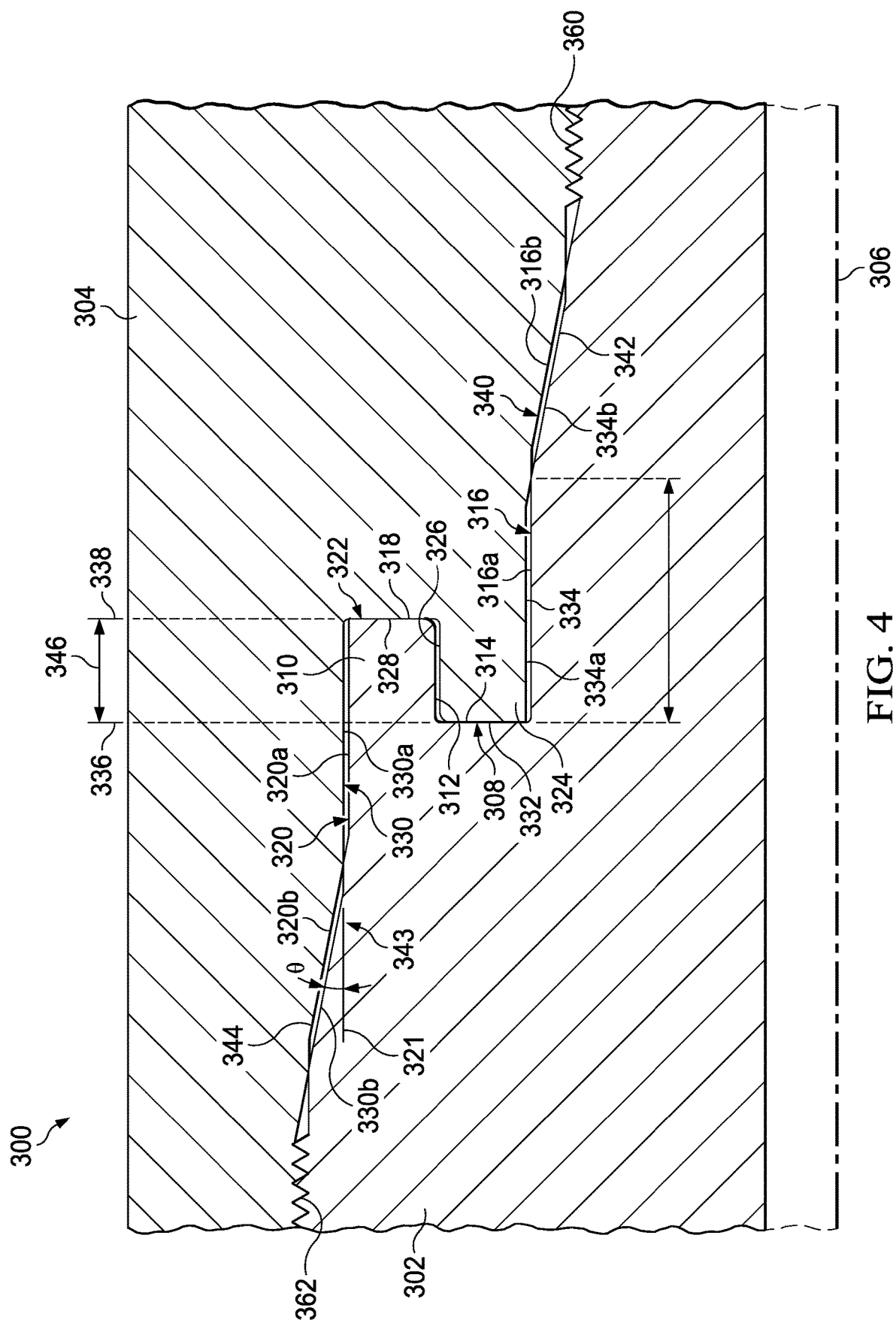
FIG. 4 is a partial cross-section of another embodiment of a center shoulder seal.

Referring to the alternative embodiment shown in FIG. 4, an embodiment of a center shoulder seal configuration 300 with axial centerline 306 in which the primary metal-to-metal contact seals are not formed by curvilinear surface portions is shown. In this arrangement, the pin end on tubular member 302 includes an annular groove 308 and an annular tooth 310. The annular groove 308 is defined by a radially inward facing (i.e., facing toward the centerline 306) undercut surface 312, an adjacent annular shoulder face 314 and an adjacent radially outward facing surface 316. The annular tooth is defined by the radially inward facing undercut surface 312, an annular tooth face 318 and a radially outward facing surface 320. The box end on tubular member 304 includes an annular groove 322 and an annular tooth 324. The annular groove 322 is defined by a radially outward facing undercut surface 326, an adjacent annular shoulder face 328 and an adjacent radially inward facing surface 330. The annular tooth 324 is defined by the radially outward facing undercut surface 326, an annular tooth face 332 and a radially inward facing surface 334.

Surface 316 includes cylindrical portion 316a and frustoconical portion 316b, while surface 334 includes cylindrical portion 334a and frustoconical portion 334b. Clearance may be provided between surface portions 316a and 334a, but the frustoconical portions 316b and 334b interfere in a manner to produce a location of primary sealing contact 340 that is axially spaced from shoulder plane 336, represented by interference contact area 342. Surface 320 includes cylindrical portion 320a and frustoconical portion 320b, while surface 330 includes cylindrical portion 330a and frustoconical portion 330b. Clearance may be provided between surface portions 320a and 330a, but the frustoconical portions 320 b and 330 b interfere in a manner to produce a location of primary sealing contact 343 that is axially spaced from shoulder plane 338, represented by interference contact area 344. To be most effective, the conical angle of each frustoconical portion 316 b, 334 b, 320 b, 330 b relative to the central axis 306 of the connection (e.g., represented in one instance in FIG. 4 by angle θ relative to line 321 that runs parallel to the central axis 306), as well as the conical angle of other embodiments incorporating frustoconical surface portions, may be between about 1° and about 7°. Engaged threaded sections 360 and 362 on opposite axial sides of the center shoulder are also shown. The axial locations of the seals and the radial thickness of the tubular members may be similar to that mentioned above with respect to the embodiment of FIG. 3.

Figure 5:
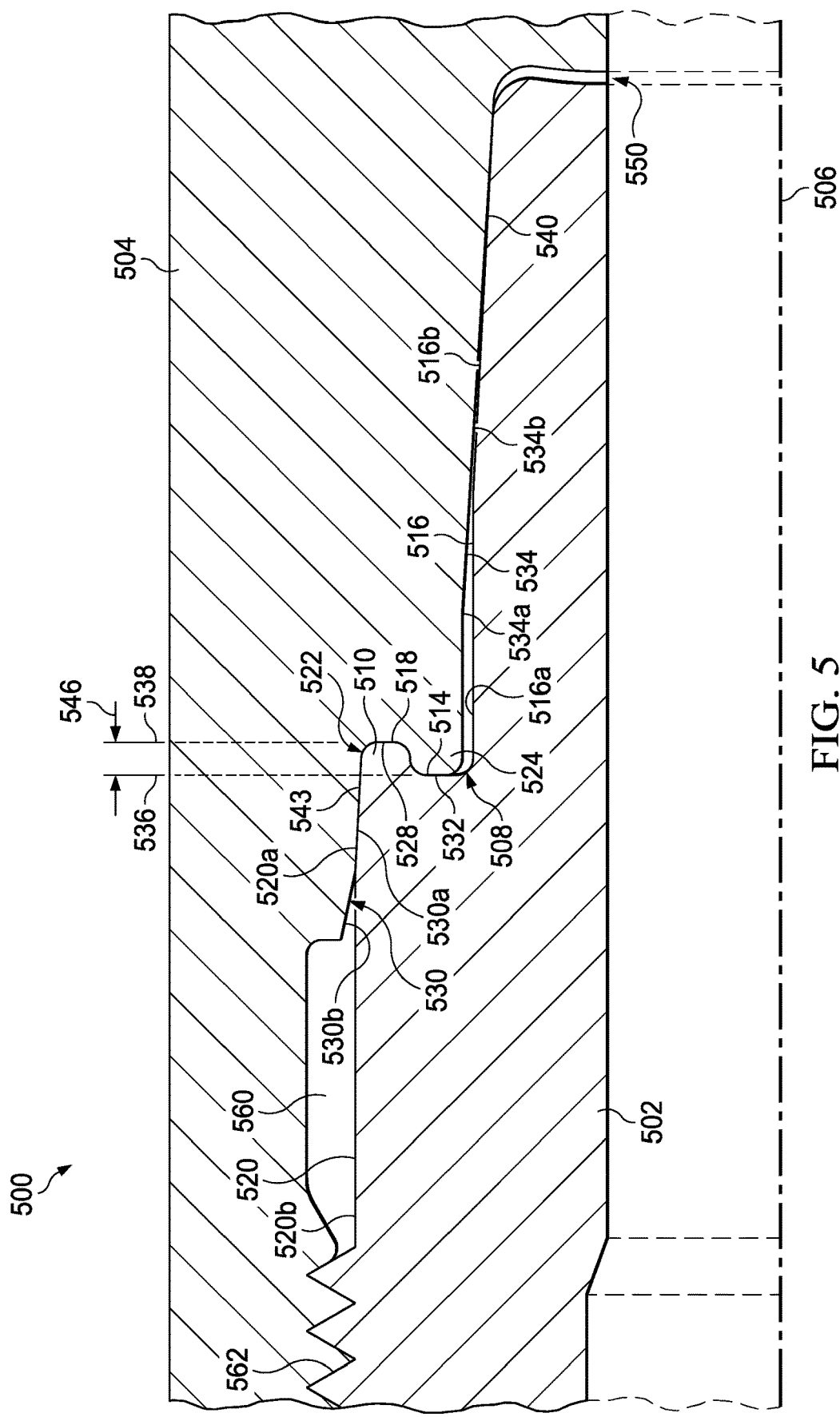
FIG. 5 is a partial cross-section of another embodiment of a center shoulder seal in which the location of primary sealing contact to opposite sides of the connection includes engaged threads to one side of the center-shoulder, but lacks any engaged threads to the other side of the center-shoulder.

Referring now to FIG. 5, an embodiment of a center shoulder seal configuration 500 with axial centerline 506 in which one side of the connection lacks engaged threads is shown. In this arrangement, the pin end on tubular member 502 includes an annular groove 508 and an annular tooth 510. As in the previous embodiments, the annular groove 508 is defined by a radially inward facing (i.e., facing toward the centerline 506) undercut surface, an adjacent annular shoulder face 514 and an adjacent radially outward facing surface 516. The annular tooth 510 is defined by the radially inward facing undercut surface, an annular tooth face 518 and a radially outward facing surface 520. The box end on tubular member 504 includes an annular groove 522 and an annular tooth 524. The annular groove 522 is defined by a radially outward facing undercut surface, an adjacent annular shoulder face 528 and an adjacent radially inward facing surface 530. The annular tooth 524 is defined by the radially outward facing undercut surface, an annular tooth face 532 and a radially inward facing surface 534.

In the illustrated embodiment, surface 516 and surface 534 are configured such that the location of primary sealing contact 540 is spaced further from the axial region 546 between the shoulder planes 536 and 538 than the location of primary sealing contact 543 between surfaces 520 and 530. In this arrangement, the location of primary sealing contact 540 may be axially spaced from the shoulder plane 536 by between about 25 thousandths of an inch and about two inches; the location of primary sealing contact 543 may be axially spaced from the shoulder plane 538 by between about 25 thousandths of an inch and about one inch; the axial region 546 may extend from between about 20 thousandths of an inch and about 250 thousandths of an inch; a radial spacing between the radially outward facing surface 516 and the radially outward facing surface 520 in the shoulder plane 536 may be between about 40 thousandths of an inch and about 500 thousandths of an inch; and a radial spacing between the radially inward facing surface 530 and the radially inward facing surface 534 in the shoulder plane 538 may be between about 40 thousandths of an inch and about 500 thousandths of an inch. In this case the location of primary sealing contact 540 will generally be within 1.75 inches of the axial region 546.

Surfaces 516 and 534 include respective cylindrical surface portions 516A and 534A with clearance provided. Surface portion 516A is followed by a curvilinear surface portion 516B, and surface portion 534A is followed by a frustoconical surface portion 534B, with location of primary sealing contact 540 occurring between portions 516B and 534B. Surface 530 includes a frustoconical portion 530A, followed by another, steeper frustoconical portion 530B, and surface 520 includes a curvilinear portion 520A that transitions to a cylindrical portion 520B. The location of primary sealing contact is between surface portion 530A and surface portion 520A. It is noted that other surface variations are possible as previously discussed. Engaged threaded sections 562 are located to one side of the center-shoulder, specifically the side that is closer to the outer diameter of the connection, while the opposite side of the connection lacks any engaged threads. Notably, on this opposite side of connection a gap 550 may be provided between the pin nose shoulder face and the box shoulder face as shown to prevent the pin nose section from yielding due to torque, compression and expansion of the material at high temperatures. The faces may, however, come into contact, such as at make-up, during compression or during material expansion. Also shown is a dope relief recess 560 in the surface 530 of box member 504 that will take-up excess thread dope as the connection makes up.

The configuration of FIG. 5 may be useful in connection with tubulars used in the geothermal markets, such as the steam assisted gravity drainage market. Although the FIG. 5 embodiment lacks any engaged threaded section at one side of the connection, it is recognized that variations are possible, including implementations in which an engaged threaded section is also provided on the side of the connection that includes the location of primary sealing contact 540 that is spaced further from the axial shoulder region 546.

Embodiments of the present techniques include a center seal of a tubular connection having contacting curvilinear surfaces. While previous techniques have involved a tooth and groove configuration to produce the center shoulder seal, the present techniques do not necessarily involve a center tooth and groove seal. A center curvilinear sealing system produces an annular seal in a tubular connection between two curvilinear surfaces approximately centered between two thread sets. Such a system may result in a more robust sealing connection compared to previous techniques. For instance, it may be more difficult to produce a seal between the tooth and groove of a tubular connection due to the precise shapes of the tooth and groove. Additionally, previous sealing techniques may be susceptible to downhole or operational forces and torque which may damage a tooth and groove connection.

The annular seal formed in the center curvilinear sealing system may be relatively more flexible. For example, unexpected forces may cause an annular seal of a center curvilinear seal to shift or adjust, rather than buckle or break. As both contacting sealing surfaces have curved geometries, bends or twists may result in shifts in the region of interference between the contacting curvilinear surfaces of two connected tubular members. Due to the geometries of two curvilinear surfaces forming a curvilinear sealing system, the curvilinear sealing system may maintain an annular seal between two connected tubular members even if a length of multiple connections are subjected to bends, twists, torque, and/or torsion, in that an axis of the annular seal may change without forming discontinuities in the annular curvilinear seal.

Figure 6:
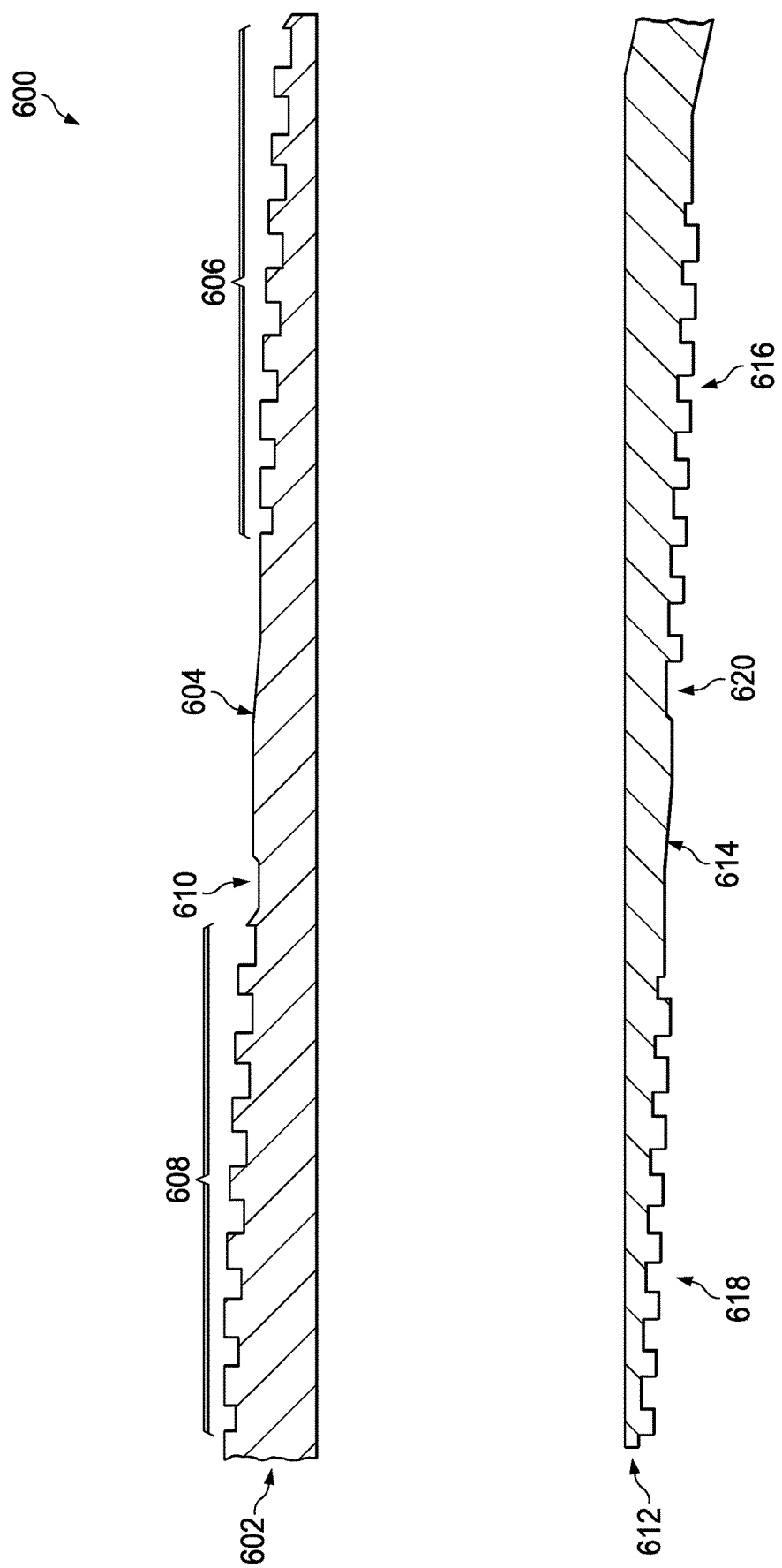
FIG. 6 is a partial cross section of an embodiment of a center seal having contacting curvilinear surfaces.

FIG. 6 is a schematic illustration of a curvilinear sealing system 600 having a curvilinear surface geometry, where a pin 602 of a tubular component and a box 612 of another tubular component each have a curvilinear surface geometry configured to form a curvilinear seal. The pin 602 has a first set of threading 606, a second set of threading 608, and a center sealing surface 604 is axially disposed between the first 606 and second 608 sets of threading. Similarly, the box 612 has a first set of threading 616, a second set of threading 618, and a center sealing surface 614 axially disposed between the first 616 and second 618 sets of threading. The first and second sets of threading of the curvilinear sealing system 600 may include wedge threads, square threads, variable pitch threads, a combination of threads, or any other thread geometry or combination of thread geometries suitable for use with the curvilinear center seal of the present techniques. For example, a square thread may include threads having a square or near-square thread geometry with tapering and substantially no flank angle. A wedge thread may include threads having a "dovetail" shape where the thread geometry increases in thread width in the radial dimension between a pin member and box member. In some embodiments, a relief pocket 610, 620 is disposed axially adjacent to the center sealing surface in the pin 602 of one tubular component and/or the box 612 of the other tubular component.

Figure 7A:
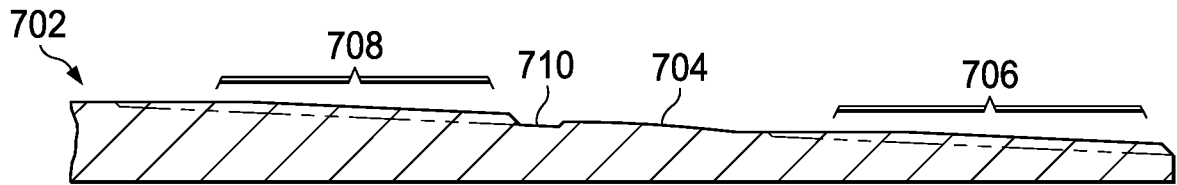
FIG. 7A is a partial cross sectional diagram of an embodiment of a curvilinear surface on a center sealing surface of one tubular member.
Figure 7B:
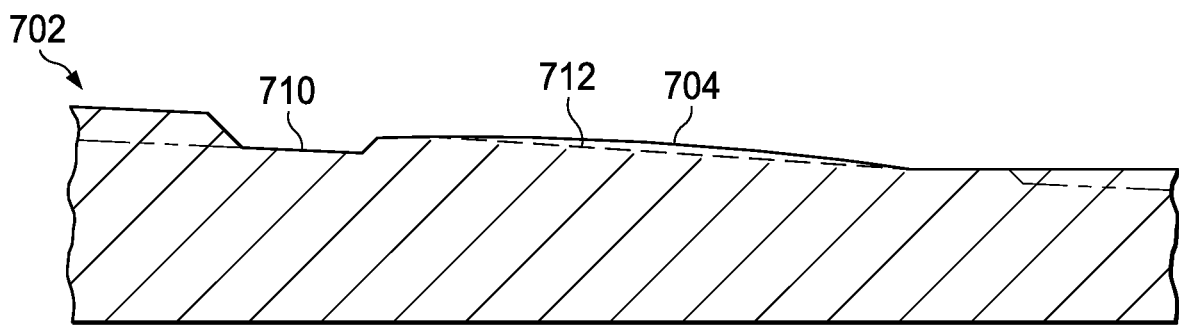
FIG. 7B is an expanded view of the curvilinear portion of the center sealing surface depicted in FIG. 7B.
Figure 7C:
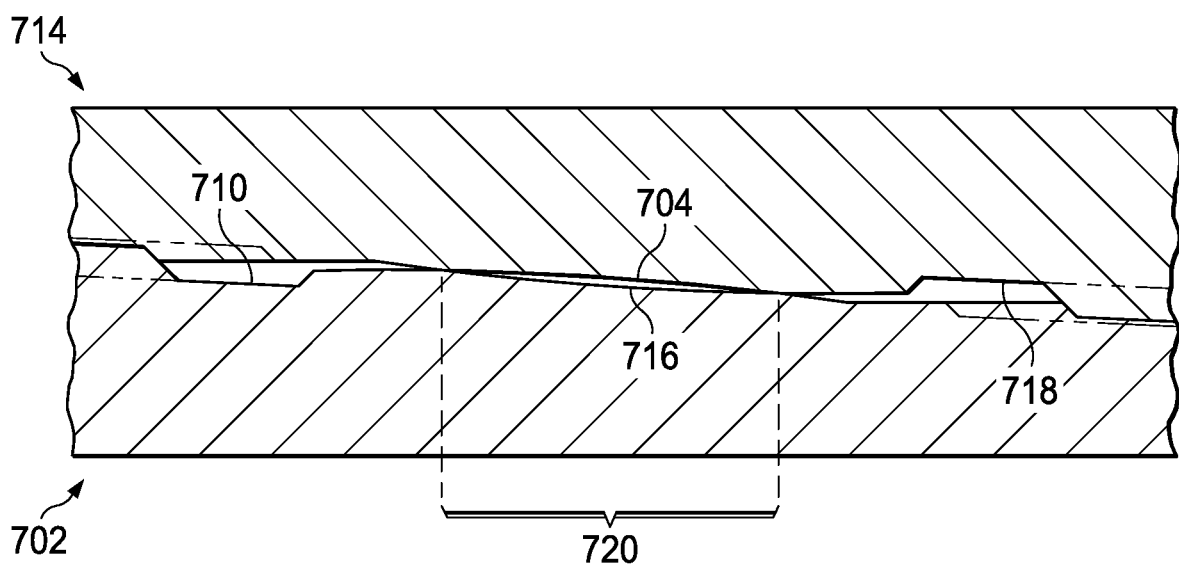
FIG. 7C is a partial cross sectional diagram of an embodiment of a center sealing surface where opposite tubular members have contacting curvilinear surfaces.

A set of partial cross sectional diagrams of one or more embodiments of a curvilinear sealing system is provided in FIGS. 7A-C, where FIG. 7A is a simplified cross sectional diagram of one tubular component 702 having a curvilinear sealing surface 704 and a relief pocket 710 disposed between two regions of threading 706 and 708. The threading regions 706 and 708 have been simplified without depicting any thread geometry, as any thread geometry may be compatible with the present techniques. FIG. 7B is an expanded diagram of the curvilinear sealing surface 704 and relief pocket 710 depicted in FIG. 7A. Embodiments of the curvilinear sealing surface 704 include curvilinear surfaces which may be an arc, curve, or portion of an elliptical, circular, spherical, or otherwise curvilinear geometry. The curvilinear sealing surface 704 may have an elliptical curve, a circular or spherical curve, a curve having a varying radius, or a combination of different curves. For example, in one embodiment, a curvilinear surface 704 may have an elliptical curve in combination of a circular curve. The curvilinear sealing surface 704 may be convex with respect to a linear pitch line 712, depicted as a dotted line in FIG. 7B, of the tubular component 702 between the two regions of threading 706 and 708. In some embodiments, the effective curve radius for a curvilinear sealing surface is between 0.5 inches and 50 inches.

FIG. 7C is a simplified cross sectional diagram of an expanded view (as in FIG. 7B) of a connection, where opposing tubular components 702 and 714 each have a curvilinear center sealing surface 704 and 716 interfering with one another, forming a region of interference 720, and may also be referred to as a curvilinear center seal 720. In some embodiments, when the two tubular components 702 and 714 are connected, the curvilinear sealing surfaces 704 and 716 engage, and the contact area of the curvilinear sealing surfaces 704 and 716 of the center seal may be referred to as an interference 720 of the two surfaces. Interference may be a region where two surfaces are designed to overlap or intersect, such that when two interfering surfaces are engaged, they form an interfering contact area. When this interfering contact area extends over an annular dimension between two tubular components, the interfering contact area may form a seal between the two tubular components. In some embodiments, the contact force in the region of interference 720 may include a compressional force between the sealing surfaces 704 and 716. The contact force in the region of interference 720 may also be described as a radial force extending along an annular dimension between the tubular components 702 and 714 to form the annular seal.

In some embodiments, the first and second curvilinear surfaces may have identical or different curve geometries. In some embodiments, the first and second curvilinear surfaces have approximately symmetrical curve radii when the first and second tubular members are in a connected configuration. However, in some embodiments, the first and second curvilinear surfaces may be offset, or may have different and/or nonsymmetrical curves when the first and second tubular members are connected.

In one embodiment, the curvilinear sealing surface in the first and second tubular members may be approximately at the center point between the first and second sets of threading. Further, in some embodiments, the interference may be approximately at the center of the first and second curvilinear sealing surfaces. For example, the interference between the two curvilinear sealing surfaces may be within 1 inch on either side from the center point between the two sets of threading. In different embodiments, the curvilinear sealing surface may be located and configured such that the curvilinear sealing surface and/or interference point may be at any point along the length of the connector, between first and second sets of threading. For example, in one embodiment, the interference point may be closer to one set of threading than the other. Embodiments having different interference locations may be more suitable for different environments having different factors and requirements (e.g., torque requirements).

As depicted in FIG. 7C, a pin and box member may each have a relief pocket 710, 718 respectively, axially disposed from the first and second curvilinear sealing surfaces 704, 716. The relief pocket 710, 718 may be sized and located to contain thread lubricant (also referred to as dope) that is displaced as a pin and box member come together into a connected configuration. The containment of the thread lubricant may reduce pressure from lubricant which may otherwise be trapped in other clearances or recesses of the connection. In some embodiments, a relief pocket may be disposed at a distance of approximately 0.025 inches to 0.500 inches away from a curvilinear sealing surface. Furthermore, while two relief pockets are oppositely disposed, axially adjacent to the center seal, embodiments of the present disclosure include different configurations and placements of the relief pockets. For example, in some embodiments, a relief pocket of the pin may be aligned with a relief pocket of the box once the first and second tubular members are connected. In other embodiments, only one relief pocket (e.g., only one on a box member or only one on a pin member) may be used, or no relief pockets may be used.

Figure 8:
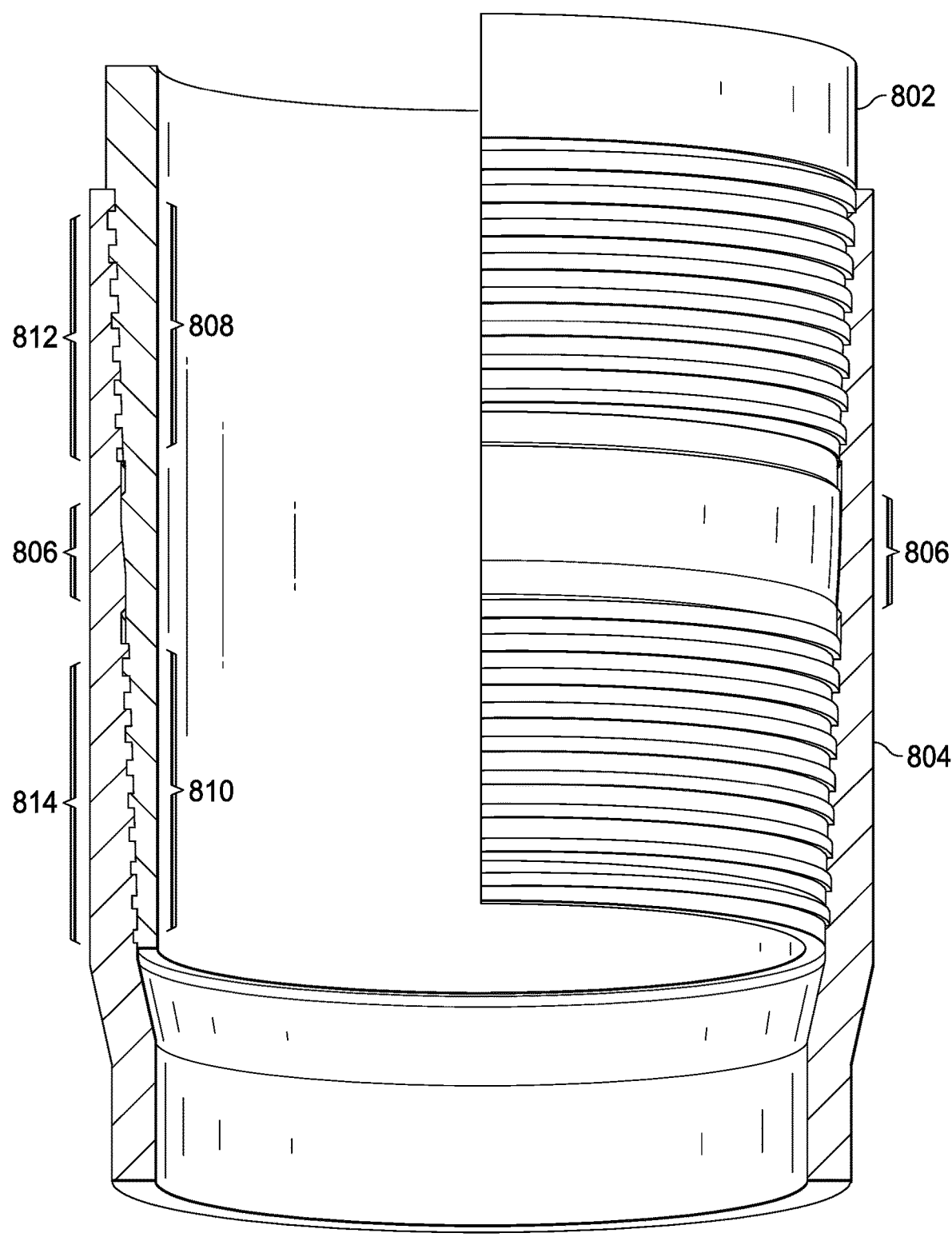
FIG. 8 is a partial cross sectional and three-quarter rendering of connected tubular members having contacting curvilinear surfaces at a center seal.

FIG. 8 is a partial cross sectional and three-quarter rendering of connected tubular members 802, 804 having contacting curvilinear surfaces at a center seal 806. In some embodiments, a curvilinear sealing surface may be approximately centered between the two thread sets 808, 810 of a pin end 802 and between the two thread sets 812, 814 of a box end 804. Moreover, in some embodiments, the interference of the contacting curvilinear sealing surfaces between the pin end and the box end forms an annular seal in the tubular connection which may be approximately centered between the engaged outer threads of the pin and box. In some embodiments, the curvilinear sealing system may be configured such that unexpected forces may cause the annular seal to shift or adjust, such that the axis of the annular seal is not always stationary. A curvilinear sealing system suitable for shifting or adjusting may be easier to operate and more robust than previous techniques, as the center seal may be maintained under various conditions.

Many modifications and other implementations set forth herein will be apparent having the benefit of the teachings presented in the foregoing descriptions and the associated drawings. Therefore, it is to be understood that the systems and methods described herein are not to be limited to the specific implementations disclosed and that modifications and other implementations are intended to be included within the scope of the appended claims. Although specific terms are employed herein, they are used in a generic and descriptive sense and not for purposes of limitation.

The invention claimed is:

1. A sealing system comprising:
   a first tubular member having a first thread set comprising wedge threads and a first curvilinear sealing surface; and
   a second tubular member having a second thread set comprising wedge threads and a second curvilinear sealing surface;
   wherein the first tubular member and the second tubular member are configured to connect when the first thread set engages with the second thread;
   wherein the first and second curvilinear sealing surfaces are configured to interfere at an interference region when the first and second tubular members connect; and
   both the first and second curvilinear sealing surfaces are curvilinear where such interference occurs.

2. The sealing system of claim 1, further comprising a first relief recess disposed on the first tubular member between the first thread set and the first curvilinear sealing surface.

3. The sealing system of claim 2, further comprising a second relief recess disposed on the second tubular member between the second thread set and the second curvilinear sealing surface.

4. The sealing system of claim 1, wherein a geometry of the first and second curvilinear sealing surfaces comprise an elliptical curve, a circular curve, a toroidal curve, a varying-radius curve, or curve combinations thereof.

5. The sealing system of claim 1, wherein the first and second curvilinear sealing surfaces comprise a curve radius between 0.5 inches to 50 inches.

6. The sealing system of claim 1, wherein the first and second curvilinear sealing surfaces are symmetrical when the first and second tubular members connect.

7. The sealing system of claim 1, wherein the first and second curvilinear sealing surfaces are asymmetrical when the first and second tubular members connect.

8. The sealing system of claim 1, wherein the first and second curvilinear sealing surfaces each have different curve geometries.

9. The sealing system of claim 1, wherein the interference region forms an annular seal between the first and second tubular members, wherein the sealing system is configured such that an axis of the annular seal may change without forming discontinuities in the annular seal.

10. A method comprising:
    moving a first tubular member relative to a second tubular member, such that a pin end of the first tubular member enters and axially overlaps with a box end of the second tubular member;
    rotating the first tubular member relative to the second tubular member, such that a first threading comprising wedge threads on the first tubular member engages with a second threading comprising wedge threads on the second tubular member and
    connecting the first tubular member to the second tubular member, such that a first curvilinear surface on the first tubular member contacts a second curvilinear surface on the second tubular member;
    wherein the first and second curvilinear sealing surfaces are configured to interfere at an interference region when the first and second tubular members connect; and
    both the first and second curvilinear sealing surfaces are curvilinear where such interference occurs.

11. The method of claim 10, wherein rotating the first tubular member relative to the second tubular member comprises displacing lubricant between the pin end and the box end into a recess on the first tubular member between the first threading and the first curvilinear surface.

12. The method of claim 10, wherein the contact force comprises a compressional force between the first and second curvilinear surfaces.

13. The method of claim 10, wherein the contact force comprises a radial force extending along an annular dimension between the first and second tubular members to form the annular seal.

* * * * *